(12) United States Patent
Nguyen (10) Patent No.: US 6,256,033 B1
(45) Date of Patent: *Jul. 3, 2001

(54) METHOD AND APPARATUS FOR REAL-TIME GESTURE RECOGNITION

(75) Inventor: Katerina H. Nguyen, Palo Alto, CA (US)

(73) Assignee: Electric Planet, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/371,214

(22) Filed: Aug. 10, 1999

Related U.S. Application Data

(63) Continuation of application No. 08/951,070, filed on Oct. 15, 1997, now Pat. No. 6,072,494.

(51) Int. Cl.$^7$ .................. G06F 3/00; G06K 9/62
(52) U.S. Cl. .............. 345/358; 345/156; 345/327; 382/209; 382/218
(58) Field of Search ..................... 345/326, 327, 345/358, 156; 382/107, 209, 217, 218

(56) References Cited

U.S. PATENT DOCUMENTS

| | | | |
|---|---|---|---|
| 4,641,349 | 2/1987 | Flom et al. | 382/2 |
| 5,148,477 | 9/1992 | Neely et al. | 382/6 |
| 5,454,043 | 9/1995 | Freeman | 382/168 |
| 5,548,659 | 8/1996 | Okamoto | 382/107 |
| 5,570,113 | 10/1996 | Zetts | 345/173 |
| 5,577,179 | 11/1996 | Blank | 395/135 |
| 5,581,276 | 12/1996 | Cipolla | 345/156 |

OTHER PUBLICATIONS

Chung–Lin Huang and Ming–Shan Wu, A Model–based Complex Background Gesture Recognition System, 1996 IEEE International Conference on Systems, Man and Cybernetics: Information Intelligence and Systems.

*Primary Examiner*—Raymond J. Bayerl
*Assistant Examiner*—Cuong T. Thai
(74) *Attorney, Agent, or Firm*—Oppenheimer, Wolff & Donnelly, LLP (57) ABSTRACT

A system and method are disclosed for providing a gesture recognition system for recognizing gestures made by a moving subject within an image and performing an operation based on the semantic meaning of the gesture. A subject, such as a human being, enters the viewing field of a camera connected to a computer and performs a gesture, such as flapping of the arms. The gesture is then examined by the system one image frame at a time. Positional data is derived from the input frames and compared to data representing gestures already known to the system. The comparisons are done in real-time and the system can be trained to better recognize known gestures or to recognize new gestures. A frame of the input image containing the subject is obtained after a background image model has been created. An input frame is used to derive a frame data set that contains particular coordinates of the subject at a given moment in time. This series of frame data sets is examined to determine whether it conveys a gesture that is known to the system. If the subject gesture is recognizable to the system, an operation based on the semantic meaning of the gesture can be performed by a computer.

22 Claims, 11 Drawing Sheets

| FRAME DATA SET |
|---|
| LEFT EXTREMITY (X,Y)<br>RIGHT EXTREMITY (X,Y)<br>CENTER OF MASS (X,Y)<br>WIDTH (X,Y)<br>TOP OF HEAD (X,Y)<br>CENTER OF HEAD (X,Y) |

METHOD AND APPARATUS FOR REAL-TIME GESTURE RECOGNITION

CROSS REFERENCE TO RELATED APPLICATION

This is a continuation of Ser. No. 08/951,070 filing date Oct. 15, 1997, now U.S. Pat. No. 6,072,494, this application is related to co-pending U.S. Pat. application Ser. No. filed herewith, and are incorporated herein by reference for all purposes.

BACKGROUND OF THE INVENTION

1. Background

The present invention relates generally to methods and apparatus for computer-implemented real-time gesture recognition. More particularly, the present invention relates to capturing a sequence of images of a subject moving subject performing a particular movement or gesture; extracting relevant data points from these images and comparing the resulting sequence of data points to patterns of data points for known gestures to determine if there is a match.

2. Prior Art

An emerging and increasingly important procedure in the field of computer science is gesture recognition. In order to make gesture recognition systems commercially useful and widespread, they must recognize known gestures in real-time and must do so with minimum or reduced use of the CPU. From a process perspective a gesture is defined as a time-dependent trajectory following a prescribed pattern through a feature space, e.g., a bodily movement or handwriting. Prior art methods for gesture recognition typically uses neural networks or a Hidden Markov Model's (HMM's) with HMM's being the most prevalent choice.

A Hidden Markov Model is a model made up of interconnected nodes or states. Each state contains information concerning itself and its relation to other states in the model. More specifically, each state contains (1) the probability of producing a particular observable output and (2) the probabilities of going from that state to any other state in the model. Since only the output is observed a system based on HMM's does not know which state it is in at any given time; it only knows what the probabilities are that a particular model produces the outputs seen thus far. Knowledge of the state is hidden from the system or application.

Examples of gesture recognition systems based on Hidden Markov Models include a tennis stroke recognition system, an American sign language recognition system, a system for recognizing lip movements, and systems for recognizing handwriting. The statistical nature of HMM's can capture the variance in the way different people perform gestures at different times. However, the same statistical nature makes HMM a "black box." For example, one state in the model may represent one particular point in a bodily gesture. An HMM-based application may know many things about this point, such as the probabilities that the gesturer will change position or move in other directions. However, the application will not be able to determine precisely when it has reached that point. Thus, the application is not able to determine whether the person has completed 25% or 50% of a known gesture.

Therefore, it would be desirable to have a real-time gesture recognition system that removes the "hidden" layer found in current systems which uses Hidden Markov Models while still capturing the variance in the way different people perform a gesture at different times. In addition, it would be desirable to have a system that would allow more control over the training and recognition of gestures.

SUMMARY OF THE INVENTION

The present invention provides a system for recognizing gestures made by a subject within a sequence of images and performing an operation based on the semantic meaning of the gesture. In a preferred embodiment, a subject, such as a human being, enters the viewing field of a camera connected to a computer and performs a gesture. The gesture is then examined by the system one image frame at a time. Positional data is derived from the input frame and compared to previously derived data representing gestures known to the system. The comparisons are done in real time and the system can be trained to better recognize known gestures or to recognize new gestures.

In a preferred embodiment, a computer-implemented gesture recognition system is described. A background image model is created by examining frames of an average background image before the subject that will perform the gesture enters the image. A frame of the input image containing the subject, such as a human being, is obtained after the background image model has been created. The frame captures the person in the action of performing the gesture at one moment in time. The input frame is used to derive a frame data set that contains particular coordinates of the subject at that given moment. These sequence of frame data sets taken over a period of time is compared to sequences of positional data making up one or more recognizable gestures i.e., gestures already known to the system. If the gesture performed by the subject is recognizable to the system, an operation based on the semantic meaning of the gesture may be performed by the system.

In another embodiment the gesture recognition procedure includes a routine setting its confidence level according to the degree of mismatch between the input gesture data and the patterns of positional data making up the system's recognizable gestures. If the confidence passes a threshold, a material is considered found.

In yet another preferred embodiment the gesture recognition procedure includes a partial completion query routine that updates a status report which provides information on how many of the requirements of the known gestures have been met by the input gesture. This allows queries of how much or what percentage of a known gesture is completed by probing the status report. This is done by determining how many key points of a recognizable gesture have been met.

In yet another embodiment the gesture recognition procedure includes a routine for training the system to recognize new gestures or to recognize certain gestures performed by an individual more efficiently. Several samples of the subject, i.e., individual, performing the new gesture are used by the system to extract the number of key points, the dimensions, and other relevant characteristics of the gesture. A probability distribution for each key point indicating the likelihood of producing a particular observable output at that key point is also derived. Once a characteristic data pattern is obtained for the new gesture, it can be compared to patterns of previously stored known gestures to produce a confusion matrix. The confusion matrix describes possible similarities between the new gesture and known gestures as well as the likelihood that the system will confuse these similar gestures.

In yet another embodiment the gesture recognition procedure visually displays the subject performing the gesture and any resulting transformations or augmentations to the subject on a computer monitor through model-based compositing. Such a compositing method includes shadow reduction and hole and gap filling routines for isolating the subject being composited.

In another aspect of the present invention a computer-based system for extracting data to be used to recognize gestures made by a subject is described. In a preferred embodiment an image modular for creating a background model that does not contain the subject is used to create an initial background model. The system includes a frame capturer for obtaining an image frame and a frame analyzer for analyzing the image thereby determining particular coordinates of the subject at a particular time. Also described is a data set creator for creating a frame data set from the particular coordinates and a data set analyzer for examining the coordinates in the frame data set and comparing them to positional data representing a known gesture.

Advantages of the methods and systems described and claimed are realtime recognition of gestures made by subjects within a dynamic background image. Gestures are recognized and processed immediately in a computer system that can also be trained to recognize new gestures or to recognize certain known gestures more efficiently. In addition, the subject is composited onto a destination image without distorting effects from shadows cast by the subject or from color uniformity between the subject and the background. This provides for a clean, well-defined composited subject on a display monitor which can be processed by the computer system according to the semantic meaning of the recognized or known gesture.

BRIEF DESCRIPTION OF THE DRAWINGS

The invention, together with further advantages thereof, may best be understood by reference of the following description taken in conjunction with the accompanying drawings in which:

FIG. 5b shows data stored in a frame data set as derived from a data or image frame containing a subject performing a gesture as described in block 502 of FIG. 5a.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

The present invention employs various processes involving data stored in computer systems. These processes are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities. Further, the manipulations performed are often referred to in terms such as identifying, running, comparing, or detecting. In any of the operations described herein that form part of the present invention, these operations are machine operations. Useful machines for performing the operations of the present invention include general purpose digital computers or other similar devices. In all cases, it should be borne in mind the distinction between the method of operations in operating a computer and the method of computation itself. The present invention relates to method blocks for operating a computer in processing electrical or other physical signals to generate other desired physical signals.

The present invention also relates to a computer system for performing these operations. This computer system may be specially constructed for the required purposes, or it may be a general purpose computer selectively activated or reconfigured by a computer program stored in the computer. The processes presented herein are not inherently related to any particular computer or other computing apparatus. In particular, various general purpose computing machines may be used with programs written in accordance with the teachings herein, or it may be more convenient to construct a more specialized computer apparatus to perform the required method blocks.

Figure 1:
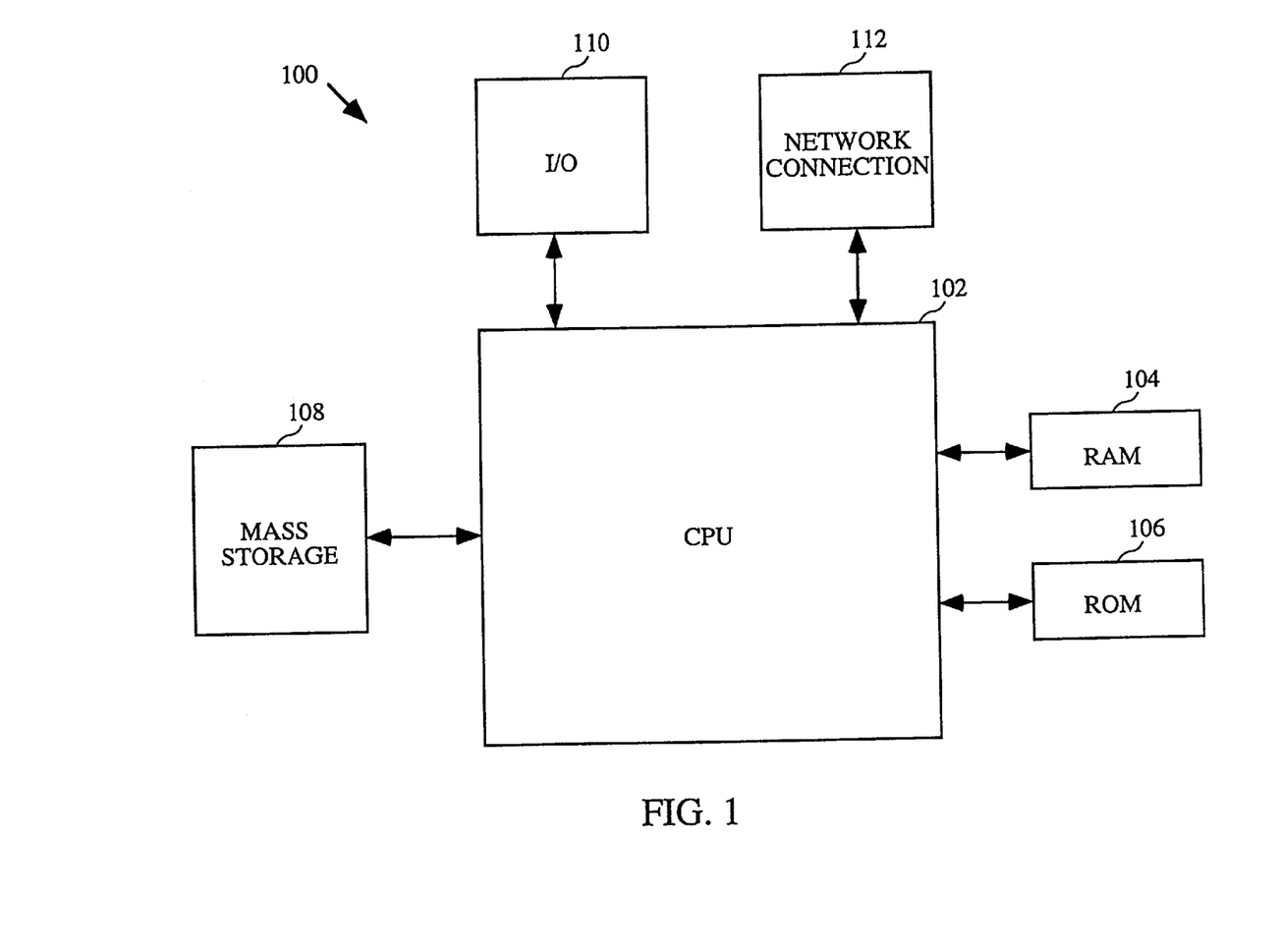
FIG. 1 is a schematic illustration of a general purpose computer system suitable for implementing the present invention.

FIG. 1 is a schematic illustration of a general purpose computer system suitable for implementing the process of the present invention. The computer system includes a central processing unit (CPU) 102, which CPU is coupled bi-directionally with random access memory (RAM) 104 and unidirectionally with read only memory (ROM) 106. Typically RAM 104 includes programming instructions and data, including text objects as described herein in addition to other data and instructions for processes currently operating on CPU 102. ROM 106 typically includes basic operating instructions, data and objects used by the computer to perform its functions. In addition, a mass storage device 108, such as a hard disk, CD ROM, magneto-optical (floptical) drive, tape drive or the like, is coupled bi-directionally with CPU 102. Mass storage device 108 generally includes additional programming instructions, data and text objects that typically are not in active use by the CPU, although the address space may be accessed by the CPU, e.g., for virtual memory or the like. Each of the above described computers further includes an input/output source 110 that typically includes input media such as a keyboard, pointer devices (e.g., a mouse or stylus) and the like. Each computer can also include a network connection 112 over which data, including, e.g., text objects, and instructions can be transferred. Additional mass storage devices (not shown) may also be connected to CPU 102 through network connection 112. It will be appreciated by those skilled in the art that the above described hardware and software elements are of standard design and construction.

As discussed above, Hidden Markov Models are typically used in current gesture recognition systems to account for variance in possible movements in a gesture. The present invention uses the HMM construct and removes the hidden nature of the model by allowing the application to determine which state in the model it is in. The present invention also forces the application to move in a certain direction by removing all the connections from a particular state to the other states except for one. For example, at state one in a Hidden Markov Model, an application may be able to go to states two, three, or four. State one would have the probabilities that from it, the gesture would go to any one of the those states. In a preferred embodiment of the present invention, the connections to states three and four are removed, thus forcing the application or system to go to state two or to stay in state one. It should be noted that the HMM construct also allows for this case, which is generally known as the left-to-right HMM. However, in an HMM implement, state one will have two probabilities: one indicating the probability that it will stay in state one and another that it will go to state two. In the present invention, there are no transition probabilities. The application will stay in state one until it meets the criteria, such as reaching a local extrema for moving to state two. Also included in a preferred embodiment of the present invention is a timing constraint built into the application. This timing constraint applies to individual states in the model. For example, a state may have a timing constraint such that the person cannot stay in a particular pose or position in the gesture for more than a predetermined length of time. Furthermore, by removing the hidden layer in the HMM, the system can determine at any time how much of a particular gesture has been completed since the system knows what state the gesture is in.

Figure 2:
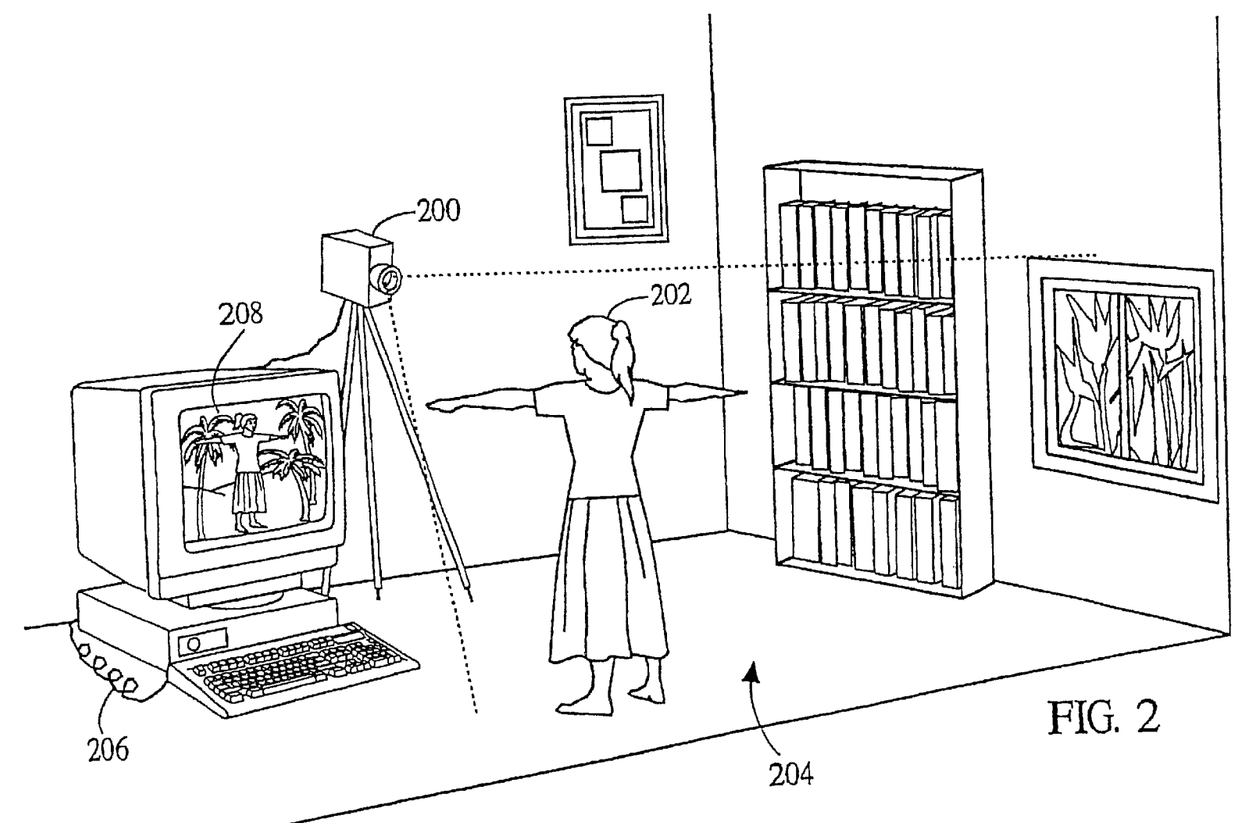
FIG. 2 is a diagram of a preferred embodiment of the present invention showing a person with arms extended and with the image composited onto a computer monitor through the use of a camera.

In another preferred embodiment of the gesture recognition system of the present invention, a training interface is included which requires a small degree of human intervention. A person can "teach" the system new gestures for it to recognize by performing samples of the new gesture in front of a camera. The user can then enter certain information about the new gesture allowing the system to create a model of the new gesture to store in its library. FIG. 2 is a diagram of a preferred embodiment of the present invention showing a person with arms extended and having the image composited on a computer monitor through the use of a camera. It shows a computer 206 connected to a camera 200. In other preferred embodiments, the camera can be located further away from the computer. Camera 200 has within its range or field of vision, a person 202 with her arms extended, as if in the middle of an arm flap gesture. In a preferred embodiment, the image of person 202 performing the gesture is composited onto a destination image 208 which is displayed on a computer monitor as shown in FIG. 2. Assuming one of the system's recognizable gestures is arm flapping, once the system recognizes that the person is performing this gesture it will perform an operation associated with that gesture. Examples of this are shown in FIGS. 3 and 4 below. In other preferred embodiments, the person's image does not need to be composited onto a destination image or displayed on the computer monitor. The system can simply recognize the gesture and perform an operation, without having to composite the image of the person. In a preferred embodiment, although the person may be located in a room with background items that are static, such as furniture, or non-static, such as a television screen or open window showing moving objects, such items are not composited onto a destination image; only the human figure is composited.

Figure 3:
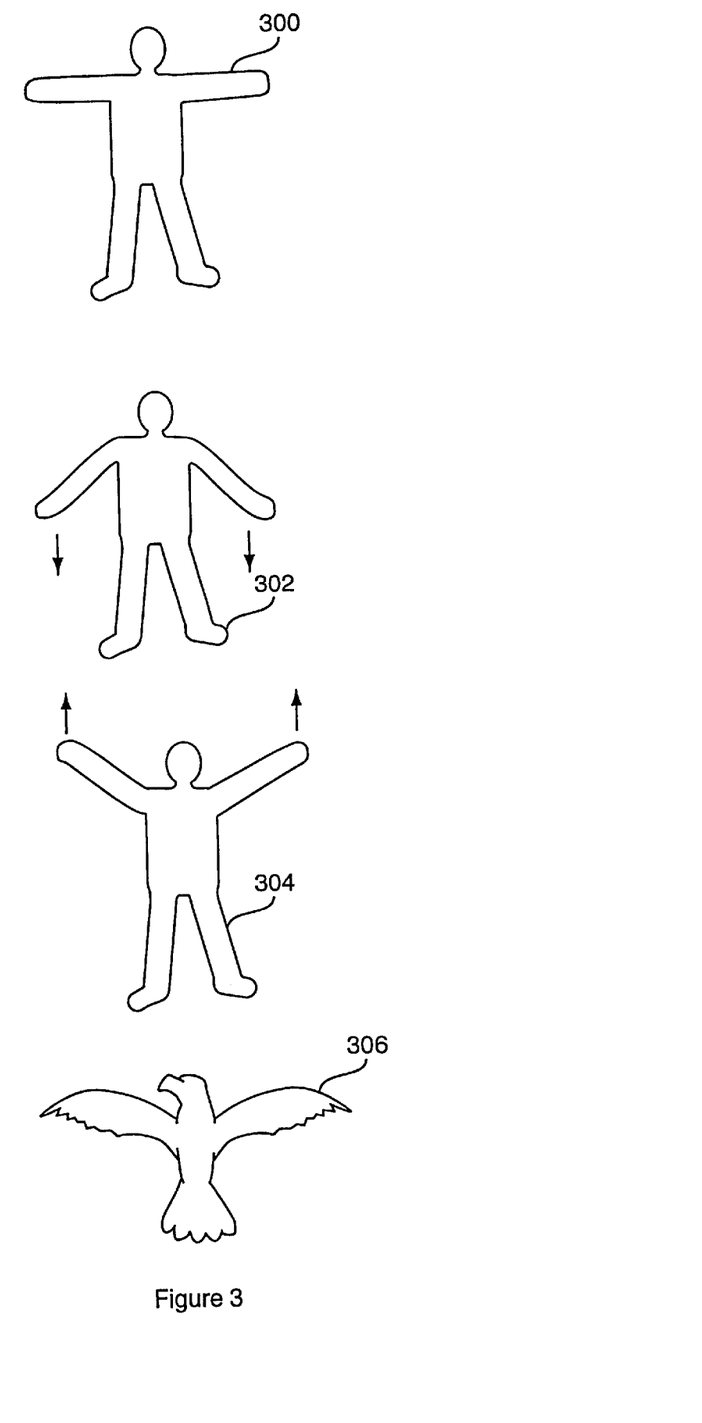
FIG. 3 shows a series of screen shots showing a human figure performing a gesture, an arm flap, and the resulting function performed by the system of transforming the human figure to an image of a flying bird.
Figure 4:
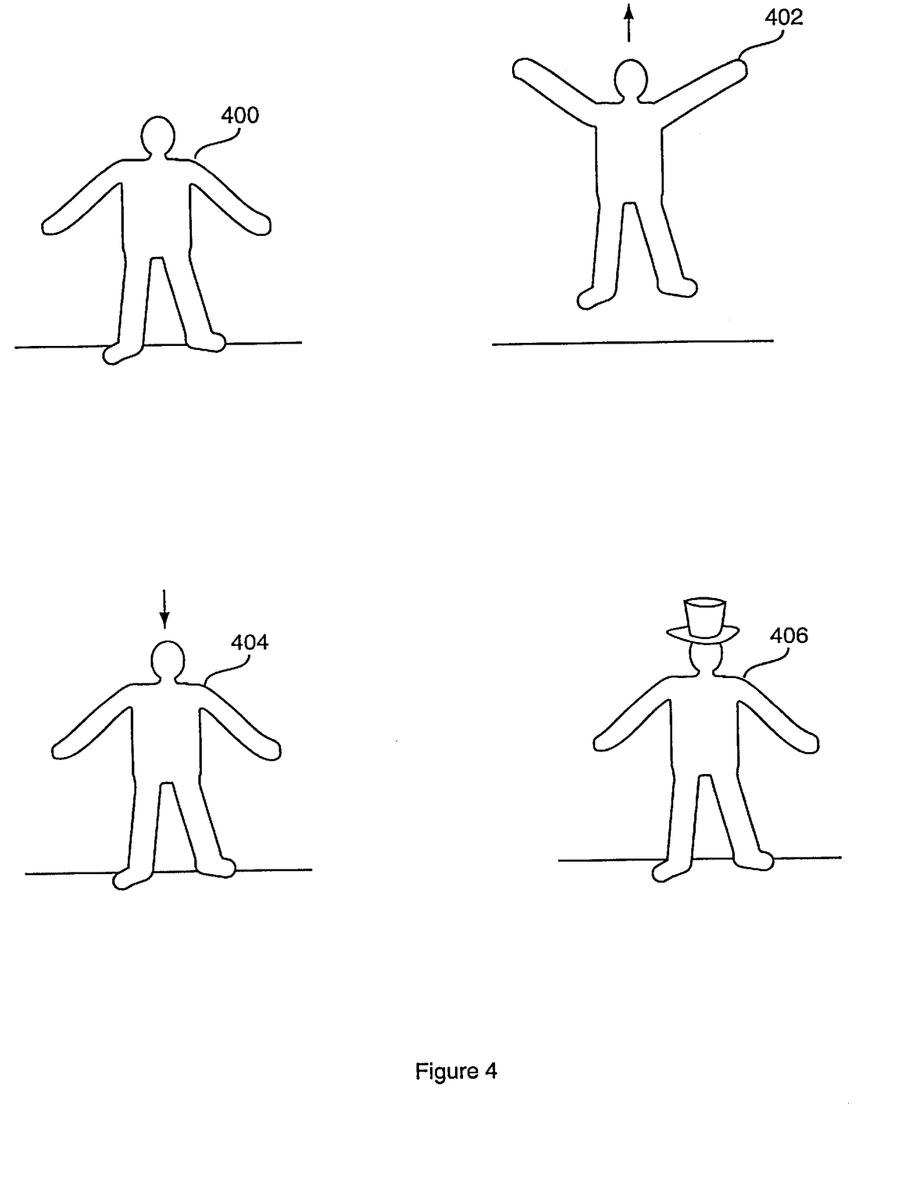
FIG. 4 shows another series of screen shots showing a human figure performing another recognizable gesture, jumping, and the system augmenting the human figure once the gesture is recognized.

FIG. 3 shows a series of screen shots showing a human figure performing a gesture—in this case an arm flap—and the resulting function performed by the system, i.e. transforming the human figure to other images of a flying bird. In other preferred embodiments, the human figure can perform other types of gestures and be transformed to another figure or be augmented, as shown in FIG. 4 below. At 300 of FIG. 3, the person is initially flapping her arms up and down at a rate acceptable to the system. This rate can vary in various embodiments but is generally dependent on factors such as camera frame speed or CPU clock speed. At shots 302 and 304, the person is moving her arms up and down in full range and is performing the complete gesture of arm flapping. Once this is done and the system recognizes the gesture, the system transforms the person to a bird as shown at shot 306. Transforming the human figure to a bird is one example of a function or operation the computer can perform once it recognizes the arm flapping gesture. More generally, once recognized the computer can perform any type of function that the computer was programmed to perform upon recognition, such as, changing applications or turning the computer on or off. Performing the recognized gesture is essentially the same as pressing a key on the keyboard or clicking a button on a mouse.

FIG. 4 shows another example of a preferred embodiment where the human figure performing a recognizable gesture—in this case jumping up and down—is augmented with a new hat by the system once it recognizes the gesture. In this example, the figure or subject is not transformed as in FIG. 3, but rather is augmented (i.e., a less significant change to the figure) by having an object, the hat, added to it. At shot 400 the figure is standing still. At shots 402 and 404 the figure is shown jumping straight up and down at an acceptable rate to the system as described above. Once this gesture is recognized by the system, the computer performs the function of augmenting the figure by placing a hat on the figure's head as shown at 406. As described above, this system can perform any type of function that it could normally perform from a user pressing a key or clicking a mouse, once it recognizes the gesture. This gesture recognition and training process is described in greater detail with respect to FIGS. 5 through 9.

Figure 5A:
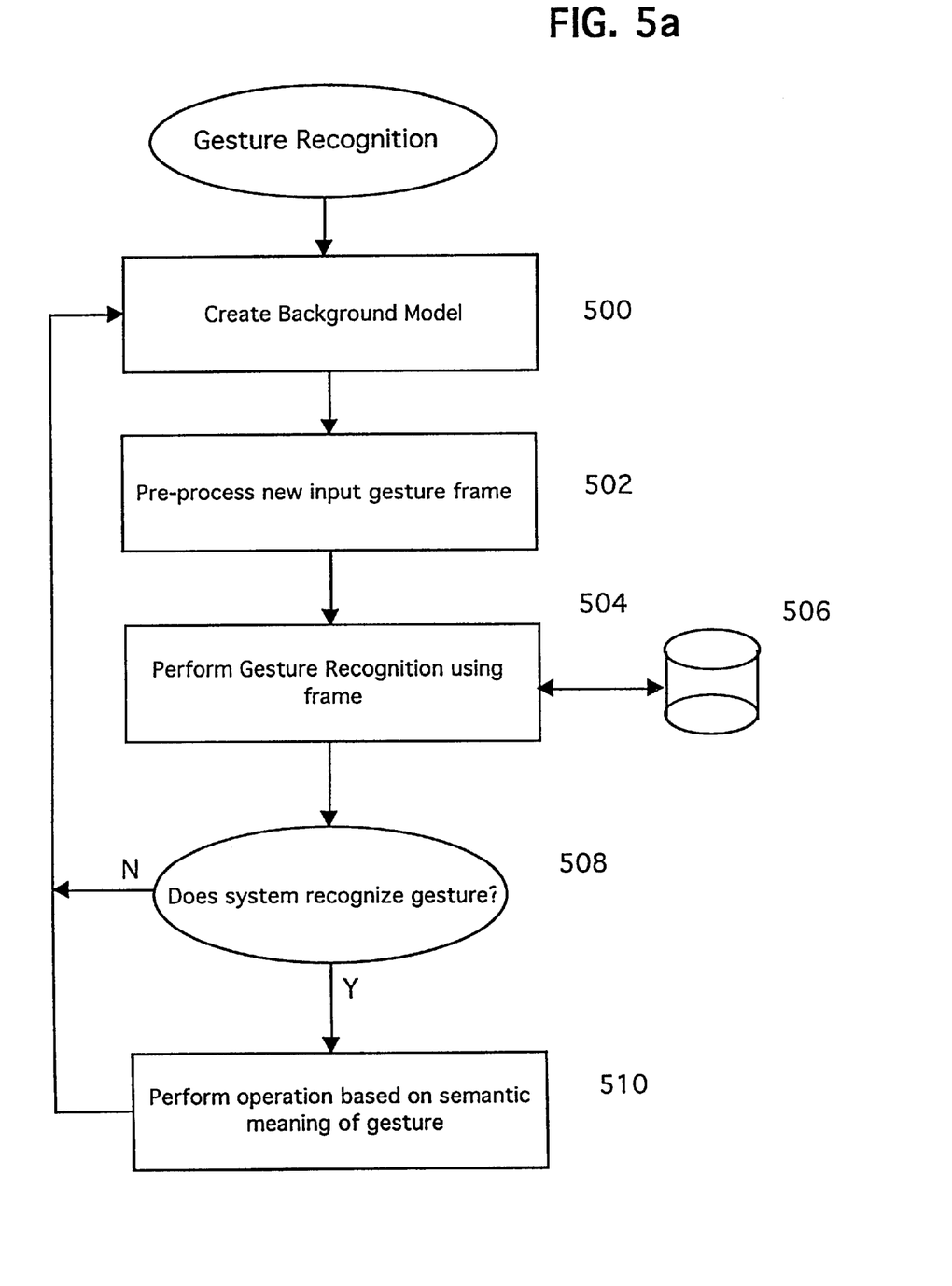
FIG. 5a is a flowchart showing a process for a preferred embodiment for gesture recognition of the present invention.

FIG. 5a is a flow diagram showing a process for a preferred embodiment of object gesture recognition of the present invention. At 500, the system creates or digitally builds a background model by capturing several frames of a background image. The background image is essentially the setting the system is being used in, for example, a child's playroom, an office, or a living room. It is the setting in which the subject, e.g. a person, will enter and, possibly, perform a gesture. A preferred embodiment of creating a background model is described in an application titled "Method and Apparatus for Model-Based Compositing" by inventor Subutai Ahmad, assigned to Electric Planet, Inc., filed on Oct. 15, 1997.

Once the background model is created in block 500, in a preferred embodiment, the system preprocesses an image frame within which the subject is performing a particular gesture in block 502. In a preferred embodiment, this preprocessing involves compositing the object onto a destination image and displaying the destination image on a computer monitor, as described with respect to FIG. 2 above. The compositing process can involve sub-processes for reducing the effect of shadows and filling holes and gaps in the object once composited. The destination image can be an image very different from the background image, such as an outdoor scene, outer space, or other type of imaginary scene. This gives the effect of the person performing a gesture, and being augmented or transformed, in an unusual environment or setting. A preferred embodiment of the compositing process is described in detail in copending application titled "Method and Apparatus for Model-Based Compositing" by inventor Subutai Ahmad, assigned to Electric Planet, Inc., filed on Oct. 15, 1997.

At 504 the system analyzes the person's gesture by performing a gesture recognition process using as data a sequence of image frames captured in block 502. A preferred embodiment of the gesture recognition process is described in greater detail with respect to FIG. 6. The gesture recognition process is performed using a gesture database as shown in block 506. Gesture database 506 contains data arrays representing gestures known to the system and other information such as status reports, described in greater detail below. The gesture recognition process deconstructs and analyzes the gesture or gestures being made by the person. At 508 the system determines whether the gesture performed by the person is actually a recognized or known gesture. The system has a set of recognizable gestures to which the gesture being performed by the person is compared. The data representing the recognizable gestures is stored in data arrays, described in greater detail with respect to FIG. 6 below. If the gesture performed by the person is a recognizable gesture, the system proceeds to block 510.

At 510 the system performs a particular function or operation based on the semantic meaning of the recognized gesture. As described above this meaning can translate to transforming the person to another figure, like a bird, or augmenting the person, for example, by adding a hat. Once the system recognizes a gesture and performs an operation based on the gesture, the system returns to block 502 and continues analyzing image frames of the person performing further gestures. That is, even though the person has performed a gesture recognizable to the system and the system has carried out an operation based on the gesture, the processing continues as long as the image frames are being sent to the system. The system will continue processing movements by the person to see if they match any of its recognizable gestures. However, if the gesture performed by the person is not recognized by the system, control also returns to block 502 where the system captures and preprocesses the next frame of the person continuing performance of a gesture (ie. the person's continuing movements in front of the camera).

Figure 5B:
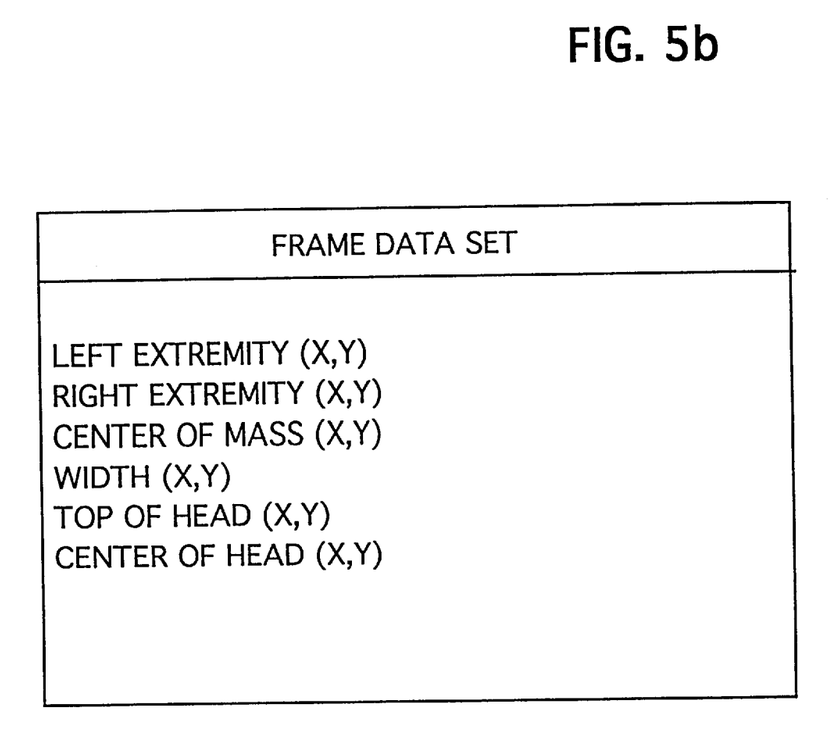

FIG. 5b shows data stored in a frame data set as derived from an image frame containing the person performing a gesture as described in block 502 of FIG. 5a. In a preferred embodiment, the frame data set shown in FIG. 5b contains x and y coordinate values of certain portions of a person performing a gesture. For example, these portions can include: a left extremity, a right extremity, a center of mass, width, top of head, and center of head. In this example, the left and right extremities can be the end of a person's right and left arms and the width can be the person's shoulder span. In other preferred embodiments, the coordinates can be of other significant or relevant portions depending on the subject performing the movements and the type of movement. The frame data set contains information on the positions (via x and y coordinates) of significant or meaningful portions of the subject's "body". What is significant or meaningful can depend on the nature and range of gestures expected to be performed by the object or that are recognized or known to the system. For example, the left and right extremities of a person are significant because one of the recognizable gestures is flapping of the arms which is determined by the movement of the ends of the person's arms. In a preferred embodiment, each image or data frame captured has a corresponding frame data set. The sequence of frame data sets is analyzed by the gesture recognition process as shown in block 504 of FIG. 5a and described in greater detail in FIGS. 6 and 7. As will be described in greater detail below, information from the frame data set is extracted in various combinations and can also be scaled as needed by the system. For example, with an arm flapping gesture the system would extract width coordinates, coordinates of right and left extremities, and center of mass coordinates, and possibly others. Essentially, the frame data set indicates the location of significant parts of the moving subject at a given moment in time.

Figure 6:
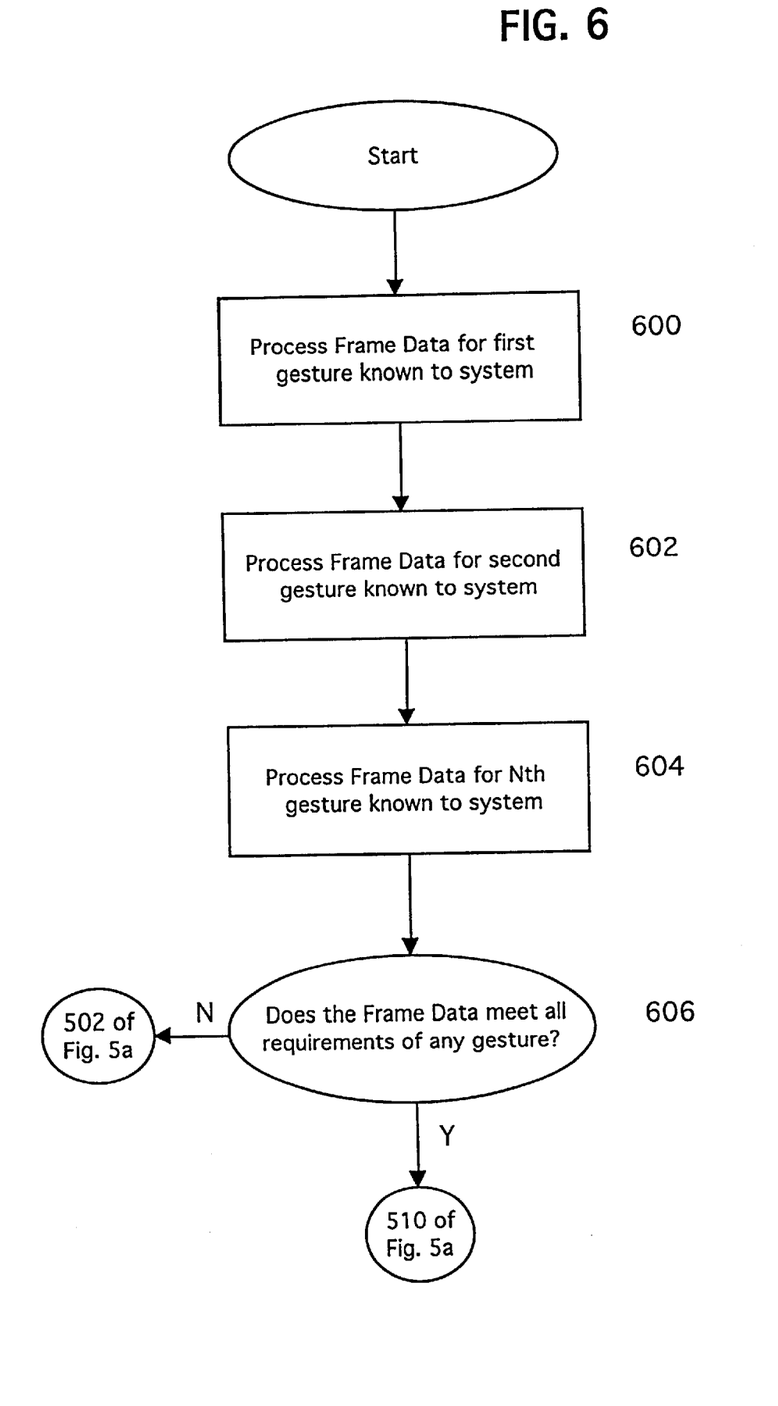
FIG. 6 is a flowchart showing in greater detail block 504 of FIG. 5a in which the system runs the gesture recognition process.

FIG. 6 is a flow diagram showing in greater detail block 504 of FIG. 5a. In step 600 the system processes the frame data for a known gesture (gesture #1). This process is repeated for each known gesture contained in the gesture database shown in FIG. 5 as item 506. Once the frame data has been compared to gesture data as shown in blocks 600 through 604 (known gesture #N), the system then determines whether the gesture made by the moving subject meets any of the completion requirements for the known gestures in the system in block 606. If the moving subject's gesture does not meet the requirements for any of the known gestures, control returns to block 502 of FIG. 5 in which the system preprocesses a new frame of the moving subject. If the moving subject's gesture meets the requirements of any of the known gestures, the system then performs an operation based on the semantic meaning of the recognized gesture. For example, if the gesture by the moving object is recognized to be a flapping gesture, the system can then transform the human figure on the monitor into a bird or other objects. The transformation to an image of a bird would be an example of a semantic meaning of the arm flapping gesture.

Figure 7A:
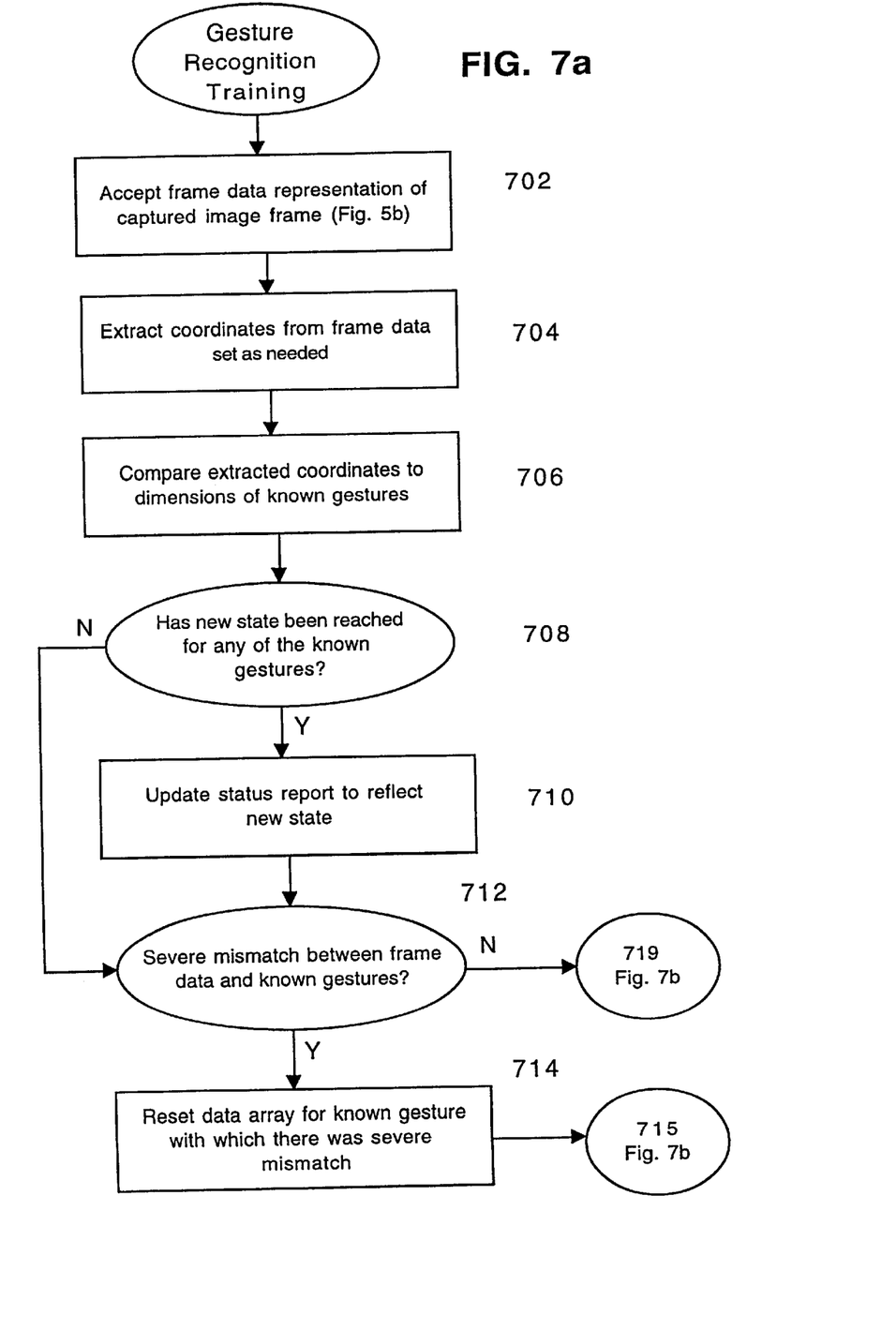
FIG. 7 is a flowchart showing in greater detail block 600 of FIG. 6 in which the system processes the frame data to determine whether it matches a recognized gesture.
Figure 7B:
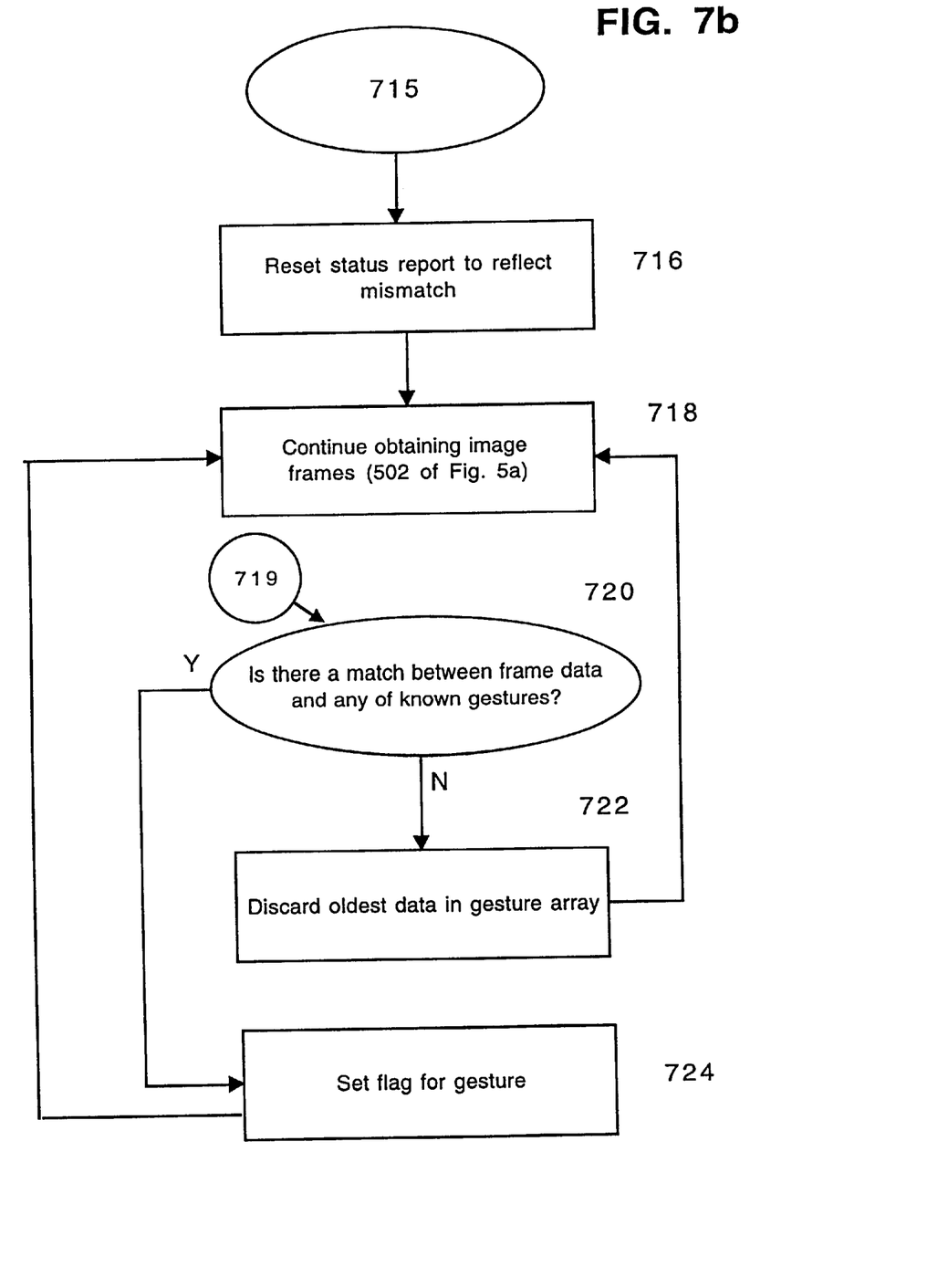

FIG. 7 is a flowchart showing in greater detail block 600 of FIG. 6 in which the system processes the frame data to determine whether it matches the completion point of a known gesture. At 700 the system begins processing a frame data set representative of a captured image frame. An example of a frame data set is shown in FIG. 5b. As described above, the frame data set contains coordinates of various significant positions of the moving subject. The frame data set contains information on the moving subject at one particular point in time. As will be described below, the system continues capturing image frames and, thus, deriving frame data sets, as long as there is movement by the subject within view of the camera.

At 702 the system will extract from the frame data set positional coordinates it needs in order to perform a proper comparison with each of the gestures known or recognizable to the system. For example, a known gesture, such as squatting, may only have two relevant or necessary coordinates that need to be checked, such as top of head and center of mass. Other coordinates do not need to be checked in order to determine whether a person is performing a squatting movement. Thus, in block 702 the system extracts relevant coordinates from the frame data set (in some cases it may be all the available coordinates) for comparison to known gestures.

At 704 the system compares the extracted positional coordinates from the frame data set to the positional coordinates of a particular point of the characteristic pattern of each known gesture. Each of the known gestures in the system is made up of one or more dimensions. For example, the flapping gesture may have four dimensions: normalized x and y for the right arm and normalized x' and y' for the left arm. A jump may have only two dimensions: one for the normalized top of the head and another for the normalized center of mass. Each dimension turns out a characteristic pattern of positional coordinates representing the expected movements of the gesture in a particular space over time. The extracted positional coordinates from the frame data set is compared to a particular point along each of these dimensional patterns for each gesture.

Each dimensional pattern has a number of key points, also referred to as states. A key point can be a characteristic pose for a particular gesture. For example, in an arm flapping gesture, a key point can be when the arms are at the highest or lowest positions. In the case of a jump, a key point may be when the object reaches the highest point. Thus, a key point can be a point where the object has a significant change in direction. Each dimension is typically made up of a few key points and flexible zones which are the areas between the key points. At 706 the system determines whether a new state has been reached. In the course of comparing the positional data to the dimensional patterns, the system determines whether the input (potential) gesture has reached a key point for any of the known gestures. Thus, if a person bends her knees to a certain point, the system may interpret that as a key point for the jump gesture or possibly a squatting or sitting gesture. Another example is a person moving her arms up to a certain point and then moving them down. The point at which the person begins moving her arms down can be interpreted by the system as a key point for the arm flap gesture. At 708 the system will make this determination. If a new state has been reached for any of the gestures, the system updates a status report to reflect this event at 710. This informs the system that the person has performed at least a part of one known gesture.

This information can be used for a partial completion query to determine whether a person's movement is likely to be a known gesture. For example, a system can inquire or automatically be informed when an input gesture has met three-quarters or two-thirds of a known gesture. This can be determined by probing the status report to see how many states of a known gesture have been reached. The system can then begin preparing for the completion of the known event. Essentially, the system can get a head start in performing the operation associated with the known gesture.

At 712 the system checks whether there is a severe mismatch between data from the frame data set and the allowable positional coordinates for each dimensional pattern of each known gesture. A severe mismatch would result, for example, from coordinates indicating a change in direction that clearly shows that the gesture does not conform to a particular known gesture (e.g., an arm going up when the system would expect it to go down for a certain gesture). A severe mismatch would first be detected at one of a known gesture's key points. If there is a severe mismatch the system resets the data array for the known gesture with which there was a mismatch at block 714. The system maintains data arrays for each gesture in which the system stores information regarding the "history" of the movements performed by the person and captured by the camera. This information is no longer needed if it determined that it is highly unlikely that the movements by the person will match a particular known gesture. Once these data arrays are cleared so they can begin storing new information, the system also resets the status reports to reflect the mismatch at block 716. By clearing the status report regarding a particular gesture, the system will not provide misleading information when a partial completion query is made regarding that gesture. The status report will indicate, at the time there is a severe mismatch, that no part of the particular gesture has been completed. At 718 the system will continue obtaining and processing input image frames of the person performing movements in the range of the camera as shown generally in FIG. 5*a*.

Returning to block 708, if a new state has not been reached for any of the known gestures, the system continues with block 712 where it checks for any severe mismatches. If there are no severe mismatches, the system checks whether there is a match between the coordinates in the frame data set and any of the known gestures in block 720. Once again, this is done by comparing the positional coordinates from the frame data to the coordinates of a particular point along the characteristic pattern of each dimension of each of the known gestures. If there is a less-than-severe mismatch, but a mismatch nonetheless, between the positional coordinates and a known gesture, the most recent data in the known gesture's data arrays is kept and older data is discarded at 722. This is also done if a timing constraint for a state has been violated. This can occur if a person holds a position in a gesture for too long. In a preferred embodiment, the subject's gesture should be continuous. New data stored in the array is stored from where the most recent data was kept. The system then continues obtaining new image input frames as shown in block 718.

If the system determines that the movements performed by the person matches a known gesture, a recognition flag for that gesture is set at 724. A match is found when the sequence of positional coordinates from consecutive frame data sets match each of the patterns of positional coordinates of each dimension for a known gesture. Once a match is found, the system can perform an operation associated with the known and recognized gesture, such as transforming the person to another image or augmenting the person, as shown on a computer monitor. However, the system will also continue obtaining input image frames as long as the person is moving within the range of the camera. Thus, control returns to block 718.

In a preferred embodiment of the present invention, it is possible for the user to enter new gestures into the system, thereby adding them to the system library of known or recognized gestures. One process for doing this is through training the system to recognize the new gesture. The training feature can also be used to show the system how a particular person does one of the already known gestures, such as the arm flap. For example, a particular person may not raise her arms as high as someone with longer arms. By showing the system how a particular person performs a gesture, the system will be more likely to recognize that gesture done by that person and recognize it sooner and with a greater confidence level. This is a useful procedure for frequent users or for users who pattern one gesture frequently.

Figure 8A:
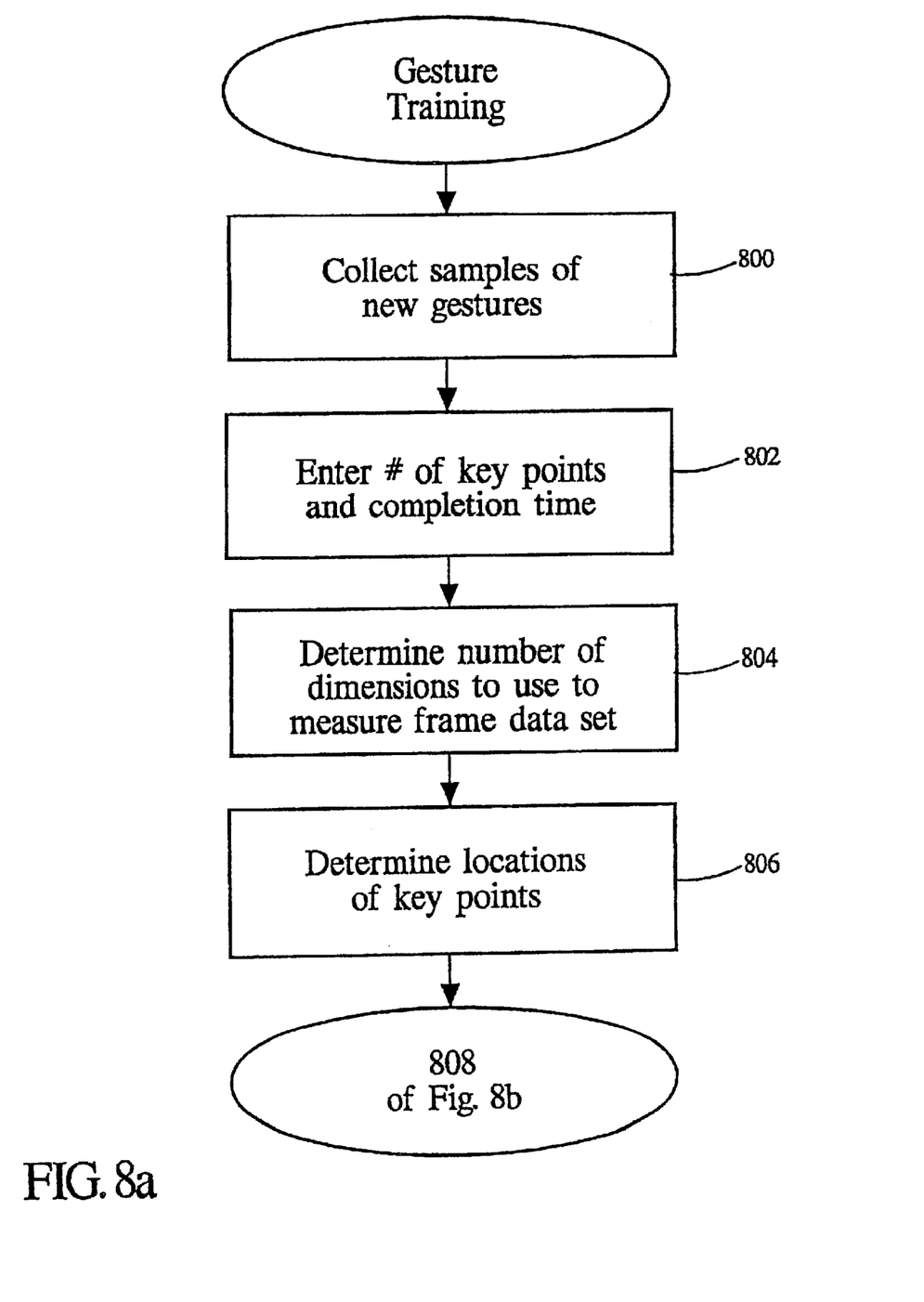
FIGS. 8A and 8B are flowcharts showing a process for training the system to recognize a new gesture.
Figure 8B:
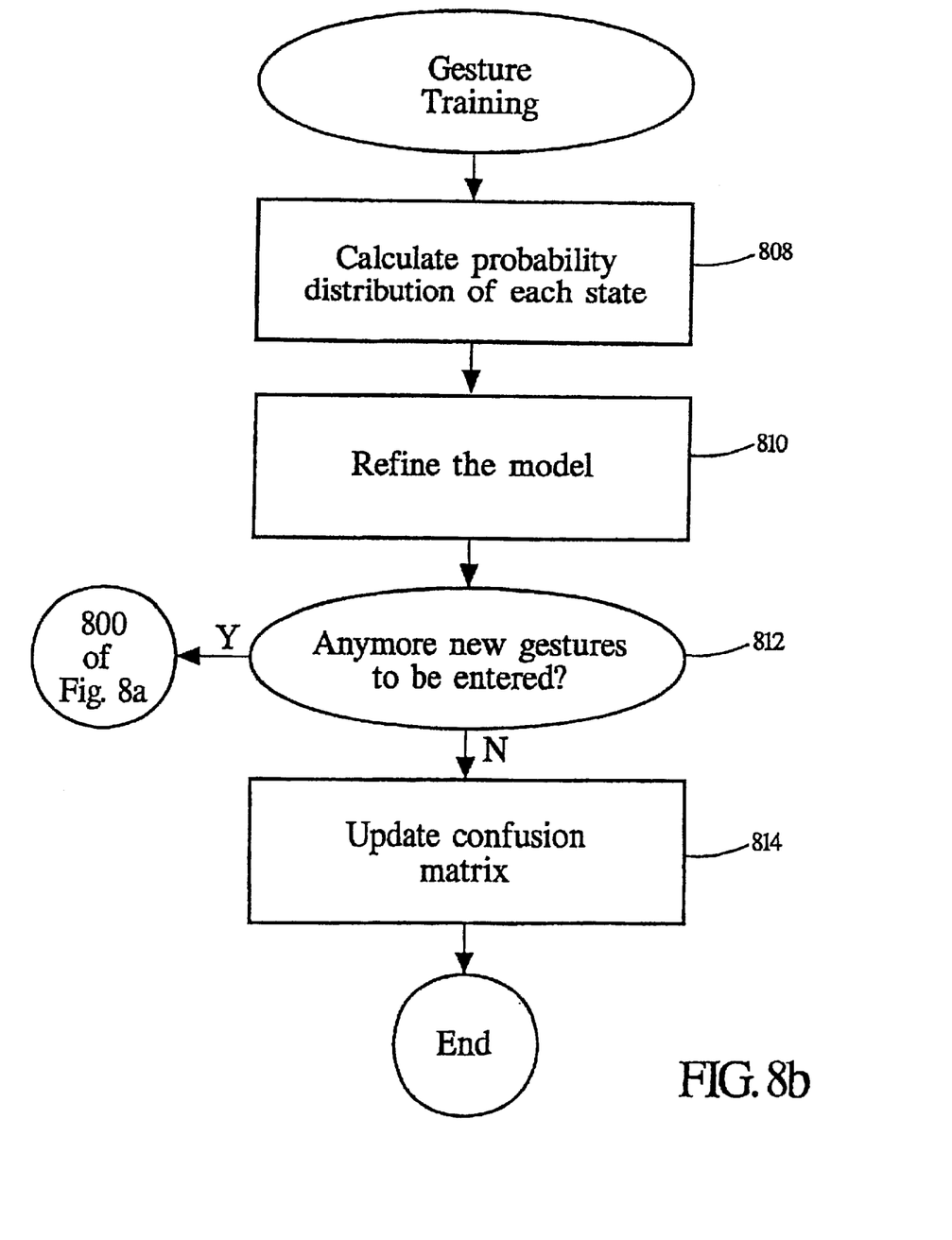

FIGS. 8A and 8B are flowcharts showing a process for training the system to recognize a new gesture. At 800 the system collects samples of the new gesture. One method of providing samples of the new gesture is for a person to enter the field of the camera and do the gesture a certain number of times. This, naturally, requires some user intervention. In a preferred embodiment, the user or users perform the new gesture about 30 times. The number of users and the number of samples have a direct bearing on the accuracy of the model representing the new gesture and the accuracy of the statistics of each key point (discussed in greater detail below). The more representative samples provided to the system, the more robust the recognition process will be.

At 802 the number of key points in the gesture is entered as well as the complete time it takes to finish one full gesture, from start to finish. Essentially, in blocks 800 and 802, the system is provided with a sequence of key points and flexible zones. The number of key points will vary depending on the complexity of the new gesture. The key points determine what coordinates from the input frame data set should be extracted. For example, if the new gesture is a squatting movement, the motion of the hands or arms is irrelevant. At 804 the system determines what dimensions to use to measure the frame data set. For example, a squatting gesture may have two dimensions whereas a more complex gesture may have four or five dimensions. In block 806 the system determines the location of the key points in a model representing the new gesture based on the starting and ending times provided by the user. The system does this by finding the most prominent peaks and valleys for each dimension, and then aligning these extrema across all the dimensions of the new gesture.

At 808 the system calculates a probability distribution of each state or key point in the model. The system has a set of routines for calculating the statistics at the key points given the set of sample gestures. The statistics of interest include the mean and variance values for each dimension of the gesture and statistics regarding the timing with respect to the start of the gesture. Using these means and variances, the system sets the allowable upper and lower bounds for the key points, which are used during the recognition phase to accept or reject the incoming input frame data sets as a possible gesture match. The system will examine the samples and derive a probability for each key point. For example, if an incoming gesture reaches the third state of a four-state gesture, the probability that the incoming gesture will match the newly entered gesture may be 90%. On the other hand, if an incoming gesture meets the newly entered gesture's first state, there may only be a 10% probability that the incoming gesture will match the newly entered gesture. This is done for each key point in each dimension for the newly entered gesture.

At 810 the system refines the model representing the new gesture by trying out different threshold values based on a Gaussian distribution. At this stage a first version of the model has already been created. The system then runs the same data from the initial samples and some extraneous data that clearly falls outside the model through the model. The system then determines how much of the first set of data can be recognized by the initial model. The thresholds of each state are initially set narrowly and are expanded until the model can recognize all the initial samples but not any of the extraneous data entered that should not fall within the model. The purpose of this is to ensure that the refined model is sufficiently broad to recognize all the samples of the gesture but not so broad as to accept arbitrary gestures (as represented by the extraneous data). Essentially, the system is determining what is an acceptable gesture and what is not.

At 812 the system checks if there are anymore new gestures to be entered into the system by examining frames of the subject's movements. If the system does not detect any additional movements by the subject, it proceeds to block 814.

At 814 the system updates a gesture confusion matrix. The matrix has an entry for each gesture known to the system. The system checks the newly trained gesture against existing gestures in the library for confusability. If the newly trained gesture is highly confusable with one or more existing gestures, it should be retrained using more features or different features. In a preferred embodiment the matrix would be made up of rows and columns in which the columns represent the known gestures and the rows represent or contain data on each of the gestures. A cell in which the data for a gesture, for example, jump, intersects with the jump column, should contain the highest confusability indicator. In another example, a cell in which a jump column intersects with a row for arm flap data should contain a low confusability factor or indicator. Once the confusion matrix has been set for the newly entered gesture, the system continues monitoring for additional movements by the subject starting with block 502 of FIG. 5*a*. Although the foregoing invention has been described in some detail for purposes of clarity of understanding, it will be apparent that certain changes and modifications may be practiced within the scope of the appended claims. For example, the image of the person performing the gesture does not need to be composited onto a destination image and then displayed on the computer monitor. The system can, for example, simply recognize the gesture and perform a particular function based on the semantic meaning of the gesture. In another example, the system can obtain data frames from another medium such as a video or film created at an earlier time, instead of obtaining the data frames from a live figure whose movements are captured by a camera in real-time. In yet another example, the frame data set can contain coordinates of sections of a moving subject other than coordinates specifically for a human body. Furthermore, it should be noted that there are alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A computer-implemented method of storing and recognizing an aspect of a subject within an image, the method including:
   a) building a background model by obtaining at least one frame of an image;
   b) obtaining a data frame containing a subject;
   c) removing background for said data frame based on said background model whereby the subject is isolated;
   d) analyzing the data frame thereby determining particular coordinates of the subject at a particular time while the subject is moving;
   e) adding the particular coordinates to a frame data set; and
   f) examining the particular coordinates such that the particular coordinates are compared to positional data making up a plurality of recognizable aspects, wherein a recognizable aspect is made up of at least one dimension such that the positional data describes dimensions of the recognized aspect.

2. A method as recited in claim 1 wherein the computer includes a network connection capable of being coupled to a network.

3. A method as recited in claim 1 wherein the data frame is transmitted over the network.

4. A method as recited in claim 1 wherein the positional data is transmitted over the network.

5. A method as recited in claim 1 and further comprising:
   e) repeating a through d for a plurality of data frames; and
   f) determining whether the plurality of the data frames when examined in a particular sequence, conveys a subject aspect by the subject that resembles a recognizable aspect, thereby causing an operation based on a predetermined meaning of the recognizable aspect be performed by a computer.

6. A computer program embodied on a computer-readable medium that stores and recognizes an aspect of a subject within an image, including:
   a) a code segment that builds a background model by obtaining at least one frame of an image;
   b) a code segment that obtains a data frame containing a subject;
   c) a code segment that subtracts background for said data frame based on said background model;
   d) a code segment that analyzes the data frame thereby determining particular coordinates of the subject at a particular time while the subject is moving;
   e) a code segment that adds the particular coordinates to a frame data set; and
   f) a code segment that examines the particular coordinates such that the particular coordinates are compared to positional data making up a plurality of recognizable aspects, wherein a recognizable aspect is made up of at least one dimension such that the positional data describes dimensions of the recognized aspect.

7. A computer program embodied on a computer-readable medium as recited in claim 6 wherein the computer includes a network connection capable of being coupled to a network.

8. A computer program embodied on a computer-readable medium as recited in claim 6 wherein the data frame is transmitted over the network.

9. A computer program embodied on a computer-readable medium as recited in claim 6 wherein the positional data is transmitted over the network.

10. A computer program embodied on a computer-readable medium as recited in claim 6 and further comprising:
    e) a code segment that repeats a through d for a plurality of data frames; and
    f) a code segment that determines whether the plurality of the data frames when examined in a particular sequence, conveys a subject aspect by the subject that resembles a recognizable aspect, thereby causing an operation based on a predetermined meaning of the recognizable aspect be performed by a computer.

11. A computer-implemented method of storing and recognizing aspect of a subject within an image, the method including:
    building a background model by obtaining at least one frame of an image;
    storing a plurality of samples of a subject;
    subtracting background for said data frame based on said background model;
    inputting a number of key points that fit in an aspect of the subject; inputting a corresponding time value representing the time of the aspect of the subject to complete; and
    wherein the key points and corresponding time value are adapted for being used to recognize aspect of the subject.

12. A method as recited in claim 11 further including:
    determining locations of key points in a model representative of the aspect of the subject.

13. A method as recited in claim 12 further including:
    refining the model such that the plurality of samples of the aspect of the subject fit within the model.

14. A method as recited in claim 11 further including:
    calculating a probability distribution for key points indicating the likelihood that a certain output will be observed.

15. A method as recited in claim 14 further including:
    calculating a confusion matrix wherein the aspect of the subject is compared with previously stored recognizable aspects so that similarities between the new aspect to previously stored recognizable aspect can be determined.

16. A method as recited in claim 11 further including:
    inputting a number of dimensions of the aspect of the subject.

17. A computer program embodied on a computer-readable medium that stores and recognizes an aspect of a subject within an image, including:
    a code segment that builds a background model by obtaining at least one frame of an image;
    a code segment that stores a plurality of samples of a subject;
    a code segment that subtracts background for said data frame based on said background model;
    a code segment that inputs a number of key points that fit in an aspect of the subject;
    a code segment that inputs a corresponding time value representing the time of the aspect of the subject to complete; and
    wherein the key points and corresponding time value are adapted for being used to recognize aspect of the subject.

18. A computer program embodied on a computer-readable medium as recited in claim 17 further including:
    a code segment that determines locations of key points in a model representative of the aspect of the subject.

19. A computer program embodied on a computer-readable medium as recited in claim 18 further including:
    a code segment that refines the model such that the plurality of samples of the aspect of the subject fit within the model.

20. A computer program embodied on a computer-readable medium as recited in claim 17 further including:
    a code segment that calculates a probability distribution for key points indicating the likelihood that a certain output will be observed.

21. A computer program embodied on a computer-readable medium as recited in claim 20 further including:
    a code segment that calculates a confusion matrix wherein the aspect of the subject is compared with previously stored recognizable aspects so that similarities between the new aspect to previously stored recognizable aspect can be determined.

22. A computer program embodied on a computer-readable medium as recited in claim 17 further including:
    a code segment that inputs a number of dimensions of the aspect of the subject.

* * * * *